UNITED STATES PATENT OFFICE.

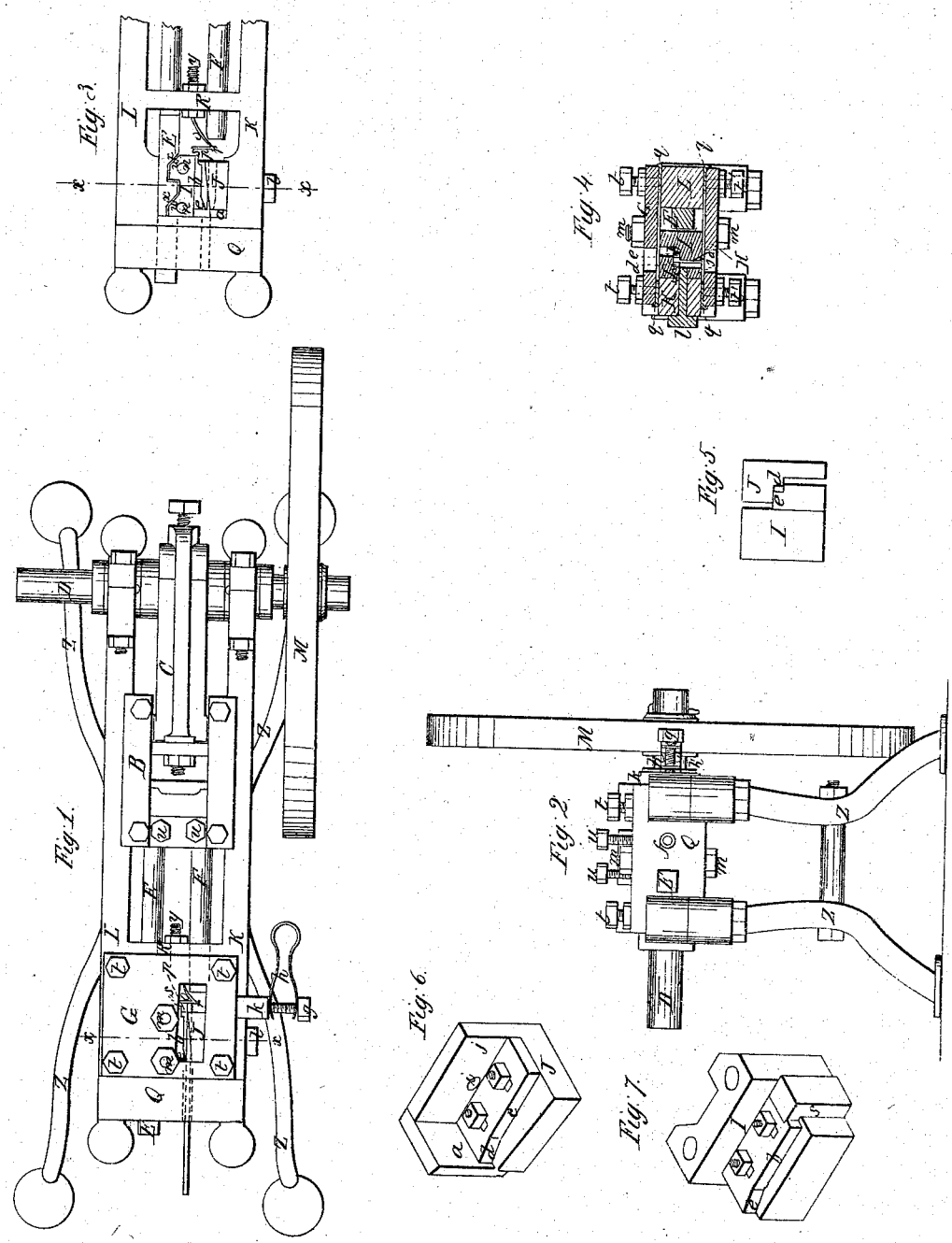

P. JEFFERSON, OF BRIDGETON, NEW JERSEY.

GAGING AND HEADING MOVEMENT FOR SPIKE-MACHINES.

Specification of Letters Patent No. 8,107, dated May 20, 1851.

*To all whom it may concern:*

Be it known that I, PURNELL JEFFERSON, of Bridgeton, in the county of Cumberland and State of New Jersey, have invented new and useful Improvements in Machines for Heading Hook-Headed Spikes; and I do hereby declare that the following is a full and exact description thereof, reference being had to the accompanying drawings, making a part of this specification, in which—

Figure 1, is a top view; Fig. 2, an end elevation; Fig. 3, a top view of one end of the machine, with some of the parts removed; Fig. 4 a section in the line $x$, $x$, of Fig. 1; and Figs. 5, 6, and 7, are views of portions of the machine detached.

Similar letters indicate like parts in all the figures.

The frame of my spike and nail making machine is composed of the parallel beams L, K, connected to each other by a suitable number of cross-ties and supported upon the legs Z, Z. The apparatus for cutting off, pointing, and heading a nail or spike, is located in the front end of the machine, and is arranged and operated in the manner hereinafter set forth.

The stationary die stock J, is secured against the inner side of the beam K, by the set screw $l$, in the position shown in Figs. 3 and 4. The stationary die $c$, $d$, may be formed in one piece with the die stock, as shown in Figs. 4 and 5, or may be secured to its stock by set screws, as shown in Fig. 6. Between the die stock J, and the end Q of the machine, is located the stationary cutter $a$, which acts in combination with the cutting edge at the front end of the movable die $b$, $e$ for cutting off the spike or nail from the rod, at the same time that the point of the said spike or nail is formed by the dies.

The movable die stock I, is located in a transversely moving carriage composed of the united plates G, H; the former resting upon the upper surface of the beams K, L, between the front end of the machine and the cross-tie R, and the plate H, being placed against the under surface of the said beams directly under the plate G; the screw bolts $m$, $m$, which confine the said plates G, H, to each other, also pass through the holes $n$, $n$, in the moving die stock I, and confine it in its position between the plates G, H. Thin friction plates $q$, $q$, are placed between the plates G, H, and the upper and lower surfaces of the beams K, L, and set screws $t$, $t'$, are inserted into screw openings in the corners of the said plates G, H; the extremities of which screws are made to bear against the friction plates $q$, $q$, and thereby enable so perfect an adjustment to be given to the plates G, H, against the upper and lower surfaces of the beams K, L, that they will work smoothly thereon.

The movable die $b$ $e$ may be made in one piece with the stock I, as shown in Figs. 4 and 5, or may be secured thereto by means of set screws, as shown in Fig. 7. The movable die stock I, is operated in the following manner, viz: The sliding bar E, which passes from the reciprocating carriage B, through guiding apertures in the cross-tie R, and in the end Q, of the machine, has notches in its side that receive lugs of corresponding shape projecting from the rear side of the said die stock, as shown in Fig. 3; when the said bar E, is moved forward, the inclined planes $x$, $x$, at the after sides of the notches therein, will bear against the inclined planes $w$, $w$, on the after sides of the lugs which project from the die stock, and will thereby impart a movement to the said die stock, which will be parallel to the sides of the sliding bar; when the desired amount of movement has thus been imparted to the die stock for severing the spike or nail from the rod, pointing the same, and firmly clamping the body of the spike or nail between the parallel faces of the dies, the said die stock is retained in that position for any desired length of time by a further forward and return movement of the sliding rod E, and the bearing of its straight and smooth inner surface against the extremities of the said lugs projecting from the die stock. A spring $h$, is made to exert a pressure upon the edges of the plates G, H, through the medium of the bearing $k$, and the set screw $g$, substantially as represented in the drawings, which will force back the said plates and the die stock I, into the position shown in Fig. 3, as soon as the sliding bar E, passes back a sufficient distance to allow the lugs on the die stock to enter the notches in the said bar. Or any other mechanical device may be employed to carry back the die stock I, to its starting position.

The faces $b$, $e$, of the movable die, are placed exactly opposite to the faces $c$, $d$, of the stationary die; a shoulder from the movable die stock passes under the stationary die, and a shoulder from the stationary die passes over the movable die, and form guides for retaining the nail or spike rod between the dies. An angular spring gage and catch o, p, r, of the form represented in the drawings is secured to, and projects forward from the cross tie R, which serves not only to gage the length of the spikes, but also aids in heading them in the manner hereinafter set forth. The heading punch F, projects forward from the reciprocating carriage B, and passes through a guiding aperture in the cross-tie R. The carriage B, slides upon the beams K, L, and is operated by the pitman C, which connects the said carriage with a cam, eccentric, or crank, on the driving shaft D.

The operation of the machine to form hook headed spikes for rail-roads, is as follows: Motion having been imparted to the machine, a rod is inserted into the hole f, in the end Q, of the frame, during the reverse movement of the die stock I, and the header F, until the end of the rod strikes against the face p, of the spring gage and catch o, p, r, as shown in Fig. 1; by the return movement of the die and punch, the rod will first be cut about half off, by the combined action of the cutting edge at the front extremity the inclined face e, of the moving die, and the edge of the stationary cutter a; the continued movement of the die b, e, will then compress the rod between the inclined faces d, e, of the dies and form the point of the spike at the same time that the cutters above mentioned, sever the spike from the remainder of the rod; and at the same time that the movable die attains to its maximum forward movement and clamps the body of the spike thus cut off and pointed, firmly between itself and the stationary die; as soon as this part of the process has been thus accomplished, the forward movement of the header F, causes it to bear against the inclined side o, of the spring gage and catch o, p, r, and forces it aside, causing the projecting catch r, of the said spring gage to bend the end of the spike as it is forced past it, when the header completes the head of the spike by compressing the end—thus partially bent—into the angle between the rear end of the face b, of the moving die, and the shoulder s, of the die stock. During the reverse movement of the sliding rod E, and the header F, the spike formed as above set forth, drops out from between the dies, and the rod is again pushed forward for the formation of another spike by the forward movement of the said parts. If preferred, the machine may be so arranged that the movement of the die may act jointly with the header and spring o, p, r, for partially bending the head of the spike.

A sufficient amount of motion can be given to the carriage B, to enable the movements of the rod E, and the header F, connected therewith, to be applied to the formation of spikes, bolts, or nails of different lengths, by changing the size and shape of the dies.

What I claim as my invention and desire to secure by Letters Patent is—

The combination of the spring gage and catch o, p, r, constructed as herein described, with the dies and with the header F, for the double purpose of gaging the length of the spikes or nails and aiding in forming the heads thereon substantially as herein set forth.

PURNEL JEFFERSON.

Witnesses:
 JOHN MOORE, Jr.,
 JNO. T. NIXON.